March 8, 1966 A. S. BERCHIELLI 3,239,380
ELECTRODE ASSEMBLY FOR BATTERY CELLS
Filed Oct. 2, 1963

INVENTOR.
ALDO SALVATORE BERCHIELLI
BY Karl J. Ross
AGENT.

United States Patent Office 3,239,380
Patented Mar. 8, 1966

3,239,380
ELECTRODE ASSEMBLY FOR BATTERY CELLS
Aldo S. Berchielli, New Hyde Park, N.Y., assignor to Yardney International Corporation, New York, N.Y., a corporation of New York
Filed Oct. 2, 1963, Ser. No. 313,250
20 Claims. (Cl. 136—6)

My present invention relates to voltaic cells, e.g. those of the alkaline type, forming part of a multicell electric battery.

The principal object of my invention is to provide an assembly of such cells, serially interconnected for high-voltage output, which is of light weight, compact dimensions and flexible structure so as to be conveniently accommodated in various types of battery casings.

Another important object of this invention is to provide an array of battery half-cells which, while also satisfying the aforestated requirements, can be assembled in greater or less numbers into a multicell battery of selected output voltage.

A further object of this invention is to provide an array of half-cells of the character referred to which may be assembled into a multicell battery by juxtaposition with a similar array and an intervening separator which may be selected at will, according to particular requirements, just prior to final assembly.

In accordance with this invention, I form two substantially identical arrays of half-cells by depositing spaced-apart electrode patches in pairs of alternate polarity on two carrier strips of nonconductive flexible sheet material, the patches of opposite polarity of each pair being conductively interconnected, and then juxtapose the two carrier strips with an intervening flexible separator in such manner that each positive patch on one carrier strip faces a negative patch on the other strip and vice versa. The separator, advantageously, is also in the form of an elongated strip subdivided into electrolyte-permeable zones or "windows" and impermeable zones insulating the windows from one another, these windows being in contact with the electrode patches so as to facilitate the bridging of confronting patches by a body of electrolyte received in the pores of the separator material.

More specifically, in order to provide a high-voltage battery assembly composed of a multiplicity of series-connected cells, I make the polarities of successive electrode patches on each carrier strip alternately positive and negative, the conductive connections between paired electrodes on the two strips being relatively staggered so that a continuous circuit exists from, say, a positive electrode patch on one carrier strip, an aligned negative electrode patch on the other carrier strip confronting the positive patch through an electrolyte-impregnated separator window, an adjoining positive electrode patch on the second carrier strip conductively connected with the aforementioned negative patch thereon, a confronting negative patch on the first carrier strip, a neighboring positive patch on the first strip conductively connected to the last-mentioned negative patch, and so forth.

Another feature of my invention resides in the provision of a row of highly conductive metallic layer deposited on each carrier strip, each such layer underlying two adjacent electrode patches of opposite polarity to serve as the conductive connection therebetween. In some cases, e.g. with rechargeable batteries or batteries designed for prolonged storage, it will be desirable to cover the exposed central portion of each conductive layer with a protective coating of substantially impervious and electrically insulating material occupying the space between the two terminal portions of the metallic layer, i.e. the portions carrying the associated electrode patches, to protect the relatively thin metallic deposit from electrolytic attack.

The electrode patches of my improved cell assembly may have a thickness of the order of 0.001", or 0.025 mm., whereas the thickness of the underlying metallic deposits may be as little as one-tenth of that value. The carrier strips may be plastic films of various types including, for example, a polyester such as polyterephthalate ("Mylar"), polyvinyl chloride or polyethylene. The protective coatings across the metallic deposits may consist of diverse lacquers, varnishes and the like, e.g. polyacrylonitrile-butadiene-styrene ("Cyclolac"), shellac or the various polymers and copolymers mentioned in commonly owned U.S. Patent No. 2,858,352, issued October 28, 1958, to Frank Solomon, which discloses a separator with permeable and nonpermeable zones of the general type mentioned above; this class of materials is also suitable for the coating and/or impregnation of selected zones of the separator strip to render them electrolytically nonpermeable. The separator strip itself may consist fundamentally of bibulous sheet material, e.g. paper, if the battery is to be of the primary (nonrechargeable) type; with storage batteries I may use regenerated cellulose or other semiconductive films known in the art.

Assemblies formed from the juxtaposition of two carrier strips and a separator strip as described above may be accordion pleated, coiled or otherwise compacted to fit into a suitable casing.

The invention will be described hereafter in greater detail, reference being made to the accompanying drawing in which.

Figure 1:
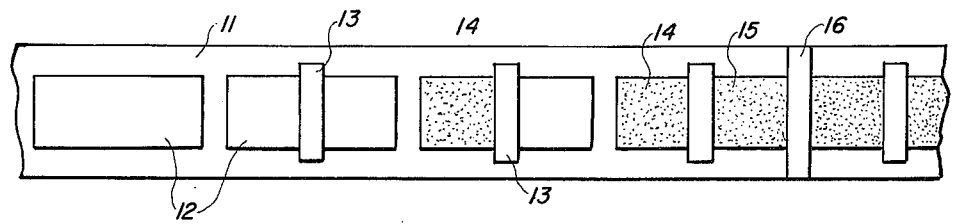
FIG. 1 is a fragmentary view of a carrier strip, showing successive steps in the formation of a series of half-cells for an electrode assembly according to the invention.

FIG. 1 shows a carrier strip 11 having printed, sprayed or otherwise deposited thereon (e.g. in vacuo) a succession of conductive rectangular layers 12 following one another with small longitudinal spacing. The layers 12 advantageously consist of some highly conductive metal such as silver, copper or gold. Next, a protective coating 13 is applied across the middle of each rectangle 12 so as to divide the remainder into two smaller rectangular or square portions of identical size. The width of the coating 13 substantially equals the separation between adjoining layers 12. On one side of each protective coating 13, e.g. to the left thereof as shown in FIG. 1, I form a patch 14 of negative active material (e.g. zinc) by printing, spraying, painting, galvanic deposition or other suitable process. On the other side of the divider 13 I produce a similar patch 15 of positive active material (e.g. silver oxide). Finally, a nonconductive barrier 16, e.g. of paraffin wax, is deposited across the width of the strip 11 between any two consecutive layers 12 and is approximately level with their electrode patches 14, 15. An array of electrochemical half-cells is thereby completed.

Figure 2:
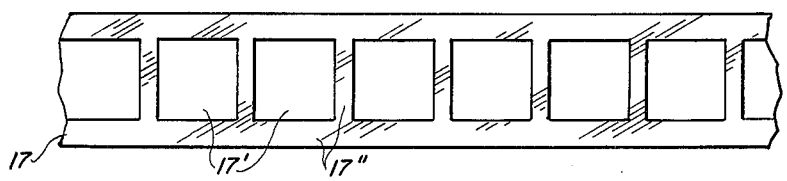
FIG. 2 is a fragmental view of a separator strip juxtaposable with the carrier strip of FIG. 1.

FIG. 2 illustrates a strip 17 of separator material with permeable windows 17' framed by nonpermeable zones 17''. The windows 17' are approximately as large as, or slightly larger than, the electrode patches 14, 15 with which they are positioned to register.

Figure 3:
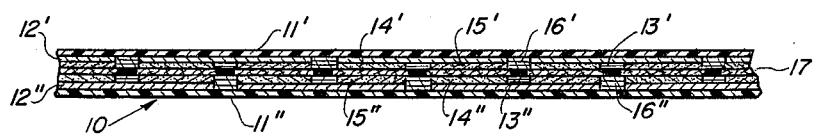
FIG. 3 is a fragmentary view illustrating, in longitudinal section, a composite of two carrier strips and one separator strip shown in FIGS. 1 and 2.

FIG. 3 illustrates an electrode assembly 10 formed by the juxtaposition of two carrier strips 11', 11'' with an intervening separator strip 17, the carrier strip being provided with conductive layers 12', 12'' which are relatively staggered so that each layer 12′ partly overlaps two adjoining layers 12″ on the other side of separator 17. The electrode patches 14′, 14″ and 15′, 15″ are disposed on the overlapping portions of the layers 12′, 12″, each electronegative patch 14′ or 14″ facing an electropositive patch 15″ or 15′, respectively. The active patches on each carrier strip 11′ or 11″ are separated from one another by dividers 13′ or 13″ at the center of the respective layers 12′ or 12″ and by barriers 16′, 16″ between the layers. By this arrangement, the electrolyte (e.g. a concentrated solution of potassium hydroxide) permeating the window 17′ of separator strip 17 will be substantially confined to the region of each cell 14′, 15″ or 15′, 14″ and will not form significant leakage paths between the cells.

Figure 4:
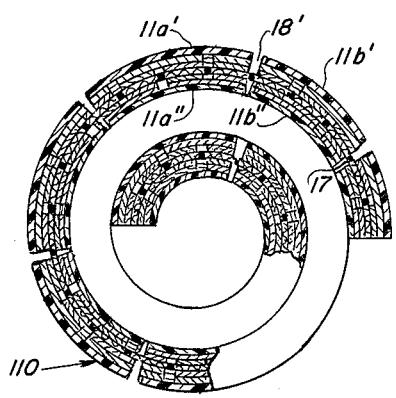
FIG. 4 shows the composite of FIG. 3 coiled into a roll.

An assembly as illustrated in FIG. 3 may be tightly packed in a cylindrical or prismatic housing (not shown). In FIG. 4 the assembly 110 has been spirally wound, the carrier strip on each side of the separator 17 having been subdivided into portions 11a′, 11b′ and 11a″, 11b″ for the purpose of limiting the extent of the relative creep between the electrode patches on opposite sides of the separator which unavoidably occurs during coiling. The gaps 18′, 18″ separating the strips 11a′, 11b′ and 11a″ 11b″, respectively, are shown relatively offset and bridged by the separator strip 17 which, however, also need not be wholly continuous but could consist of longitudinally adjoining sections overlapping the carrier-strip portions. Each strip portion 11a′, 11b′, etc. carries only a limited number of electrode patches, e.g. ten, constituting but a small fraction of the total number of half-cells wound into a spiral.

Figure 5:
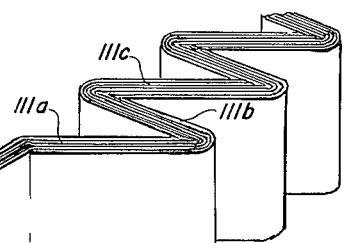
FIG. 5 shows the same composite (parts broken away) accordion pleated to form a stack.

The assembly 210 illustrated in FIG. 5 shows the carrier strips 111′, 111″ as part of a single sheet 111 folded longitudinally to align the respective electrode patches 14′, 15′ with their counterparts 15″, 14″ (not visible in FIG. 5) across the separator strip 17. The composite is then accordion pleated as seen on the right-hand side of FIG. 5, each pleat 111a, 111b, etc. containing one positive and one negative electrode patch together constituting a cell.

Various modifications of the assemblies described and illustrated are, of course, possible without departing from the spirit and scope of my invention as defined in the appended claims.

I claim:

1. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each patch on said first strip facing a patch of opposite polarity on said second strip; means for conductively interconnecting the patches of opposite polarity of each of said pairs; and electrolyte-permeable flexible separator means interposed between the facing patches of opposite polarity on said first and second strips.

2. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each patch on said first strip facing a patch of opposite polarity on said second strip; a common conductive layer contacting the patches of opposite polarity of each of said pairs between the latter and the respective strip; and electrolyte-permeable flexible separator means interposed between the facing patches of opposite polarity on said first and second strips.

3. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each patch on said first strip facing a patch of opposite polarity on said second strip; a common conductive layer contacting the patches of opposite polarity of each of said pairs between the latter and the respective strip; an impervious insulating coating on a central surface of said layer between the pairs of patches contacted thereby; and electrolyte-permeable flexible separator means interposed between the facing patches of opposite polarity on said first and second strips.

4. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each patch on said first strip facing a patch of opposite polarity on said second strip; means for conductively interconnecting the patches of opposite polarity of each of said pairs; and a continuous flexible separator strip interposed between the facing patches of opposite polarity on said first and second strips, said strip having permeable zones in contact with said patches and insulated from one another by substantially impermeable zones between adjacent patches.

5. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each patch on said first strip facing a patch of opposite polarity on said second strip; a common conductive layer contacting the patches of opposite polarity of each of said pairs between the latter and the respective strip; and a continuous flexible separator strip interposed between the facing patches of opposite polarity on said first and second strips, said strip having permeable zones in contact with said patches and insulated from one another by substantially impermeable zones between adjacent patches.

6. An electrode assembly for battery cells, comprising electrolytically impermeable first and second carrier strips of nonconductive flexible sheet material; a series of spaced-apart patches of electrochemically active material of positive and negative polarity grouped in alternate-polarity pairs on each of said strips, said strips being juxtaposed with each path on said first strip facing a patch of opposite polarity on said second strip; a common conductive layer contacting the patches of opposite polarity of each of said pairs between the latter and the respective strip; an impervious insulating coating on a central surface of said layer between the pairs of patches contacted thereby; and a continuous flexible separator strip interposed between the facing patches of opposite polarity on said first and second strips, said strip having permeable zones in contact with said patches and insulated from one another by substantially impermeable zones between adjacent patches.

7. An electrode assembly for battery cells, comprising electrolytically impermeable first and second carrier strips of nonconductive flexible sheet material; a series of spaced-apart patches of alternatively positive and negative electrochemically active material on said first strip; a series of identically spaced-apart patches of alternately negative and positive electrochemically active material on said second strip, said strips being juxtaposed with each patch on said first strip facing a patch of opposite polarity on said second strip; a first series of conductors interconnecting successive pairs of patches on said first strip; a second series of conductors interconnecting successive pairs of patches on said second strip in staggered relationship with said first series of conductors; and electrolyte-permeable flexible separator means interposed between the facing patches of opposite polarity on said first and second strips.

8. An electrode assembly as defined in claim 7 wherein said strips are part of a longitudinally folded single sheet.

9. An electrode assembly as defined in claim 7 wherein said strips are accordion pleated between successive patches, thereby forming a single stack of series-connected cells.

10. An electrode assembly as defined in claim 7 wherein said strips are wound together into a roll.

11. An electrode assembly as defined in claim 10 wherein at least one of said strips is interrupted between patches.

12. An electrode assembly as defined in claim 11 wherein both said strips are interrupted at relatively offset locations, said separator means extending continuously between said strips past said locations.

13. An electrode assembly for battery cells, comprising electrolytically impermeable first and second carrier strips of nonconductive flexible sheet material; a first row of conductive layers disposed in identical spaced-apart formations on said first strip; a second row of like layers disposed on said second strip in staggered relationship with said first row, said strips being so juxtaposed that each layer of said first row overlaps two neighboring layers of said second row; a series of spaced-apart patches of electrochemically active material of alternate polarity on each of said strips, said patches being disposed in opposite-polarity pairs on said layers in their respective regions of overlap whereby the patches of each pair are conductively interconnected by the underlying layer, the polarities of said patches being relatively inverted on said first and second strips whereby each patch on said first strip faces a patch of opposite polarity on said second strip; and electrolyte-permeable flexible separator means interposed between the facing patches of opposite polarity on said first and second strips.

14. An electrode assembly as defined in claim 13 wherein the patches on each layer are separated from each other by a substantially impervious insulating coating overlying an intermediate surface of the associated layer.

15. An electrode assembly as defined in claim 13 wherein said separator means comprises a continuous strip having permeable zones in contact with said patches, said permeable zones being insulated from one another by impermeable zones between adjacent patches.

16. An electrode assembly as defined in claim 13, further comprising a barrier of non-conductive material on each of said carrier strips between successive layers in the space between the carrier strip and said separator means.

17. An array of half-cells juxtaposable with a like array across an intervening separator to form a multicell battery, comprising a carrier strip of nonconductive material; a series of patches of alternatively positive and negative electrochemically active material longitudinally spaced apart on said strip; and a series of conductors individually interconnecting successive pairs of patches of opposite polarity.

18. An array of half-cells juxtaposable with a like array across an intervening separator to form a multicell battery, comprising an electrolytically impermeable carrier strip of nonconductive flexible sheet material; a series of patches of alternately positive and negative electrochemically active material longitudinally spaced apart on said strip; and a series of conductors individually interconnecting successive pairs of patches of opposite polarity.

19. An array of half-cells juxtaposable with a like array across an intervening separator to form a multicell battery, comprising a carrier strip of nonconductive material; a series of elongated metallic layers longitudinally spaced apart on said strip; a patch of electronegative electrode material on one terminal portion of each of said layers; and a patch of electronegative electrode material on the other terminal portion of each of said layers, said patches of electronegative and electropositive material following one another in alternate succession.

20. An array of half-cells juxtaposable with a like array across an intervening separator to form a multicell battery, comprising an electrolytically impermeable carrier strip of nonconductive flexible sheet material; a series of generally rectangular metallic layers longitudinally spaced apart on said strip; a patch of electronegative electrode material on one terminal portion of each of said layers; and a patch of electropositive electrode material on the other terminal portion of each of said layers, said patches of electronegative and electropositive material following one another in alternate succession.

No references cited.

WINSTON A. DOUGLAS, *Primary Examiner.*